United States Patent [19]
Suzuki et al.

[11] Patent Number: 5,992,781
[45] Date of Patent: Nov. 30, 1999

[54] INDIRECT DRIVE MECHANISM FOR RECORDING AND REPRODUCING APPARATUS CAPABLE OF ACCOMODATING DIFFERENT SIZE CASSETTES

[75] Inventors: Kazuyoshi Suzuki, Tokyo; Akihiro Uetake, Kanagawa; Toshio Mamiya, Tokyo; Katsuji Akimoto, Tokyo; Masaki Takase, Tokyo, all of Japan

[73] Assignee: Sony Corporation, Japan

[21] Appl. No.: 08/799,265

[22] Filed: Feb. 13, 1997

Related U.S. Application Data

[63] Continuation of application No. 08/267,934, Jul. 6, 1994, abandoned.

[30] Foreign Application Priority Data

Jul. 7, 1993 [JP] Japan ..................................... 5-191794
Jul. 15, 1993 [JP] Japan ..................................... 5-175601

[51] Int. Cl.⁶ ............................. G11B 23/04; G11B 5/008
[52] U.S. Cl. ........................ 242/336; 242/334.6; 360/94
[58] Field of Search .................................. 242/336, 356, 242/334.6; 360/94, 96.4, 85

[56] References Cited

U.S. PATENT DOCUMENTS

| | | | |
|---|---|---|---|
| 4,448,370 | 5/1984 | Miyazi et al. | 242/356 |
| 4,490,757 | 12/1984 | Mogi | 360/94 |
| 5,438,466 | 8/1995 | Koguchi et al. | 242/356 X |

FOREIGN PATENT DOCUMENTS

| | | | |
|---|---|---|---|
| 0312397 | 4/1989 | European Pat. Off. | |
| 0399807 | 11/1990 | European Pat. Off. | |
| 0463786 | 1/1992 | European Pat. Off. | |
| 0548852 | 6/1993 | European Pat. Off. | |
| 3327403 | 4/1985 | Germany. | |
| 58-19763 | 2/1983 | Japan | 242/336 |

Primary Examiner—John Q. Nguyen
Attorney, Agent, or Firm—Rader, Fishman & Grauer; Ronald P. Kananen

[57] ABSTRACT

A recording and reproducing apparatus has an indirect drive arrangement in which the reel turntables are rotated by an existing motor, such as a capstan motor or the like. The reel turntables can pivot about supporting points on a chassis such that they can be moved between large and small cassette driving positions. A drive gear supported on a swing arm and which is driven by a capstan motor, is selectively meshed with one of the driven gears provided on the two reel turntables.

8 Claims, 11 Drawing Sheets

INDIRECT DRIVE MECHANISM FOR RECORDING AND REPRODUCING APPARATUS CAPABLE OF ACCOMODATING DIFFERENT SIZE CASSETTES

This application is a continuation of application Ser. No. 08/267,934 filed Jul. 6, 1994, abandoned.

BACKGROUND OF THE INVENTION

The present invention relates to a recording and reproducing apparatus and, more particularly, to a miniaturized, lightweight and inexpensive recording and reproducing apparatus to which two tape cassettes of different sizes can be loaded.

A recording and reproducing apparatus has been proposed wherein two tape cassettes of different sizes having supply reels and take-up reels can be loaded and wherein the reel turntables that engage the tape reels, are accordingly translated between two positions. This recording and reproducing apparatus further includes reel motors which are exclusively dedicated to rotating the reel turntables and which enable the translation of the reel turntables between the two positions.

Since the recording and reproducing apparatus includes motors which are exclusively provided for rotating the respective reel motors as described above, there is the disadvantage that the members which support the reel turntables are inevitably increased in size and weight. Further, there is the disadvantage that the mechanism for translating the reel turntables between the two positions becomes complex.

Furthermore, when both the reel turntables are driven by a single reel turntable motor or when the two reel turntables are indirectly driven by using the driving force of another motor, the reel turntables need to be translated by a mechanism which applies proper torque to the reel turntables and a mechanism which detects the rotation of the reel turntables. However, this arrangement is also complex in arrangement.

OBJECTS AND SUMMARY OF THE INVENTION

In view of the aforesaid aspect, it is an object of the present invention to provide a recording and reproducing apparatus which can be miniaturized.

It is another object of the present invention to provide a recording and reproducing apparatus which is light in weight.

It is a further object of the present invention to provide a recording and reproducing apparatus which is inexpensive.

It is yet a further object of the present invention to provide a recording and reproducing apparatus in which reel turntables can be rotated using an existing motor, such as a capstan motor or the like, without the need for a motor exclusively-driving the reel turntables.

It is yet a further object of the present invention to provide a recording and reproducing apparatus in which the proper amount of torque is applied to the reel turntables.

It is still a further object of the present invention to provide a recording and reproducing apparatus in which a rotation of the reel turntable can be detected with ease.

According to a first aspect of the present invention, there is provided a recording and reproducing apparatus to which two tape cassettes of different sizes having supply reels and take-up reels to and around which respective ends of a recording medium tape is fixed and wound are loaded, the supply reels and the take-up reels being spaced apart by different spacings and in which reel turntables in engagement with the two tape reels are translated between two positions. This recording and reproducing apparatus comprises a drive gear for rotating the reel turntable, a swing arm pivotally supported to a mechanical deck portion, the swing arm having the drive gear pivotally provided thereon, and driven gears being coaxially provided on the two reel turntables, wherein the drive gear is selectively meshed with one of the driven gears and the reel turntable is rotated by driving the drive gear.

Therefore, according to the recording and reproducing apparatus of the present invention, even when the reel turntable is located at any one of the two positions, the driven gear provided on the reel turntable can be meshed with the drive gear so that the reel turntable can be rotated by transmitting the drive force of other motor to the drive gear. Thus, the motor exclusively-designed for rotating the reel turntable can be removed and at least two reel turntables can be rotated by one reel turntable motor.

According to a second aspect of the present invention, there is provided a recording and reproducing apparatus to which two tape cassettes of different sizes having supply tape reels and take-up reels which are spaced apart by different spacings are loaded and in which two reel turntables that are in engagement with the two tape reels are translated between two positions. The recording and reproducing apparatus is comprised of a mechanism in which the reel turntables are rotated about a supporting shaft provided on a mechanical deck portion so as to be translated and a swing supporting point gear provided coaxially with the supporting point shaft is meshed with reel turntable gears of the reel turntables, and a braking mechanism provided on one of the swing arm supporting gear, the gear provided coaxially with the supporting point gear and a gear or a gear train of the swing supporting point gear at its side opposing a reel turntable gear side for controlling a rotational torque of the reel turntables.

According to a third aspect of the present invention, the recording and reproducing apparatus further includes a mechanism in which the reel turntables are rotated about a supporting shaft provided on a mechanical deck portion so as to be translated and a swing supporting point gear provided coaxially with the supporting point shaft is meshed with reel turntable gears of the reel turntables, and a clutch mechanism provided on one of the swing supporting point gear and a gear or a gear train of the swing supporting point gear at its side opposing a reel turntable gear side for applying a predetermined tape tension to a tape in a tape path condition.

According to a fourth aspect of the present invention, the recording and reproducing apparatus further includes a mechanism in which the reel turntables are rotated about a supporting shaft provided on a mechanical deck portion so as to be translated and a swing supporting point gear provided coaxially with the supporting point shaft is meshed with reel turntable gears of the reel turntables, and a one-way mechanism provided on one of the swing supporting point gear and a gear or a gear train of the swing supporting point gear at its side opposing a reel turntable gear side.

According to the present invention, the two reel turntables can be meshed with the swing supporting point gear supported to the supporting point shaft provided on the mechanical deck portion and translated by a driving source based on an existing motor. Since the braking mechanism is provided on one of the swing supporting point gear, the gear provided coaxially with the swing supporting point gear and the gear of the gear train of the swing supporting point gear at its side opposing the reel turntable gear side, a rotational torque of the tape reel turntables can be controlled.

Further, according to the present invention, since the clutch mechanism is provided on the swing supporting point gear and the gear of the gear train of the swing supporting point gear at its reel turntable gear side, a predetermined tape tension can be applied to the tape in the tape path condition.

Furthermore, according to the present invention, since the one-way mechanism is provided on the swing supporting point gear and the gear of the gear train of the swing supporting point gear at its side opposing the reel turntable gear side, a tape rewind operation and a tape forward operation can be carried out property.

BRIEF DESCRIPTION OF THE DRAWINGS

A better understanding of other objects, features, and advantages of the present invention can be gained from a consideration of the following detailed description of illustrative embodiments thereof, in conjunction with the figures of the accompanying drawings, in which.

DETAILED DESCRIPTION OF THE PREFERRED EMBODIMENTS

A recording and reproducing apparatus according to the present invention will hereinafter be described in detail with reference to the accompanying drawings.

Initially, outlines of a large tape cassette and a small tape cassette used in the recording and reproducing apparatus according to the present invention will be described below.

Figure 1:
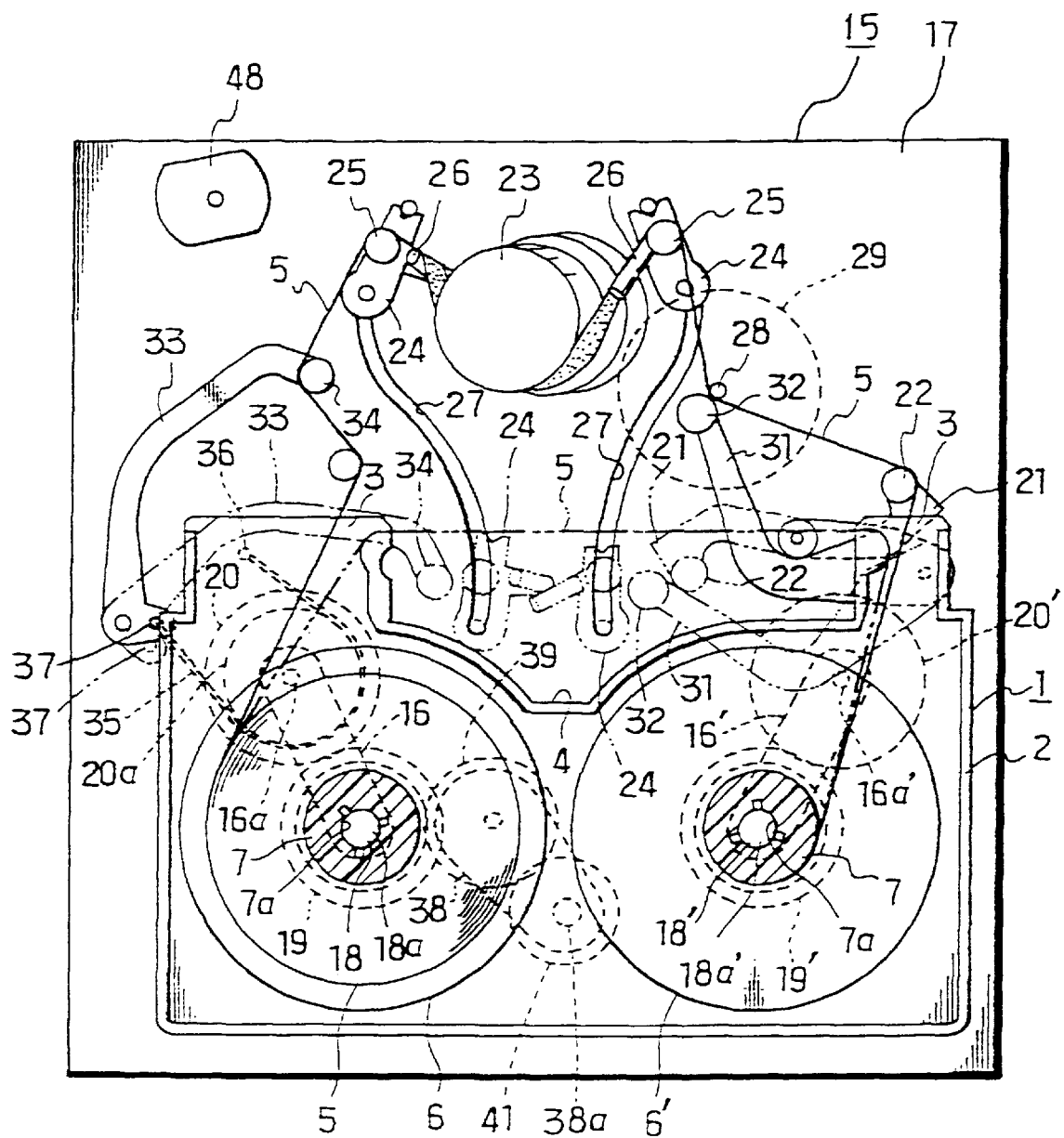
FIG. 1 is a plan view of a recording and reproducing apparatus according to an embodiment of the present invention and illustrating in horizontal cross-section the condition wherein a large tape cassette is loaded on the recording and reproducing apparatus.

As shown in FIG. 1 of the accompanying drawings, there are provided a large tape cassette 1 and a cassette case 2 of the large tape cassette 1.

The cassette case 2 has an oblong rectangular flat box-shape as seen from above. The cassette case 2 includes tape exits 3, 3 formed through left and right end portions of the front wall thereof and also include a mouth portion 4 opened between the tape exits 3 and 3 in the front and lower directions.

The cassette case 2 accommodates therein rotatable tape reels 6, 6' to which respective end portions of a magnetic tape 5 are fixed and around which the magnetic tape 5 is wound. These tape reels 6, 6' have reel hubs 7, 7' through which reel turntable engagement apertures 7a, 7a are formed. These reel turntable engagement apertures 7a, 7a are exposed to the outside through reel turntable insertion apertures (not shown) in the bottom wall of the cassette case 2.

The magnetic tape 5 travels from the tape exits 3, 3 to the outside of the cassette case 2 and is positioned along the front wall of the mouth portion 4.

In addition, there are provided other elements, such as a front lid which is pivotally supported to the front surface portion of the cassette case 2 so as to open and close the front surface of the magnetic tape 5 extended along the front wall of the cassette case 2. These elements are not directly related to the present invention and therefore need not be shown and described herein.

Figure 2:
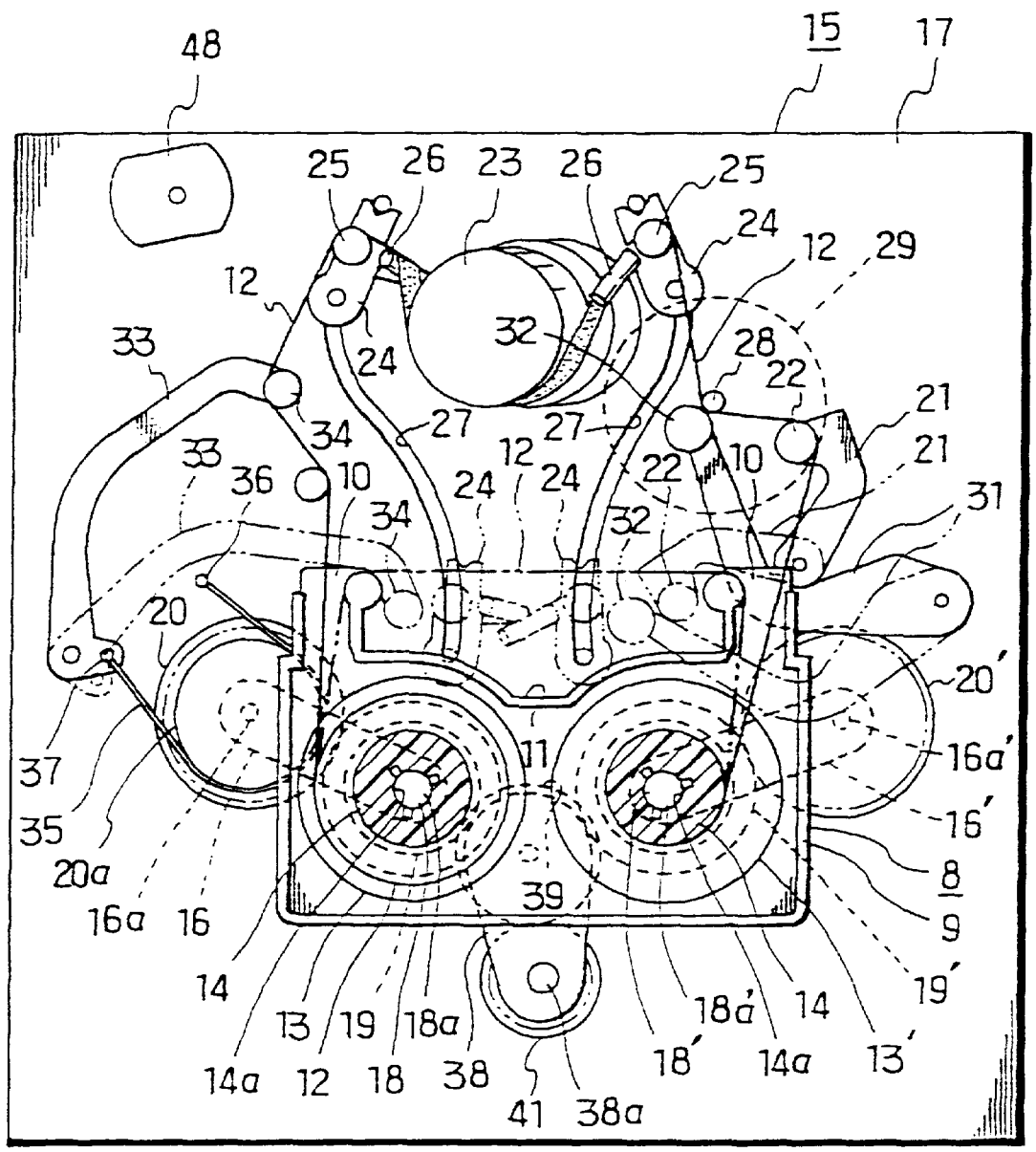
FIG. 2 is a plan view of the recording and reproducing apparatus according to the embodiment of the present invention and illustrating in horizontal cross-section the condition wherein a small tape cassette is loaded on the recording and reproducing apparatus.
Figure 3:
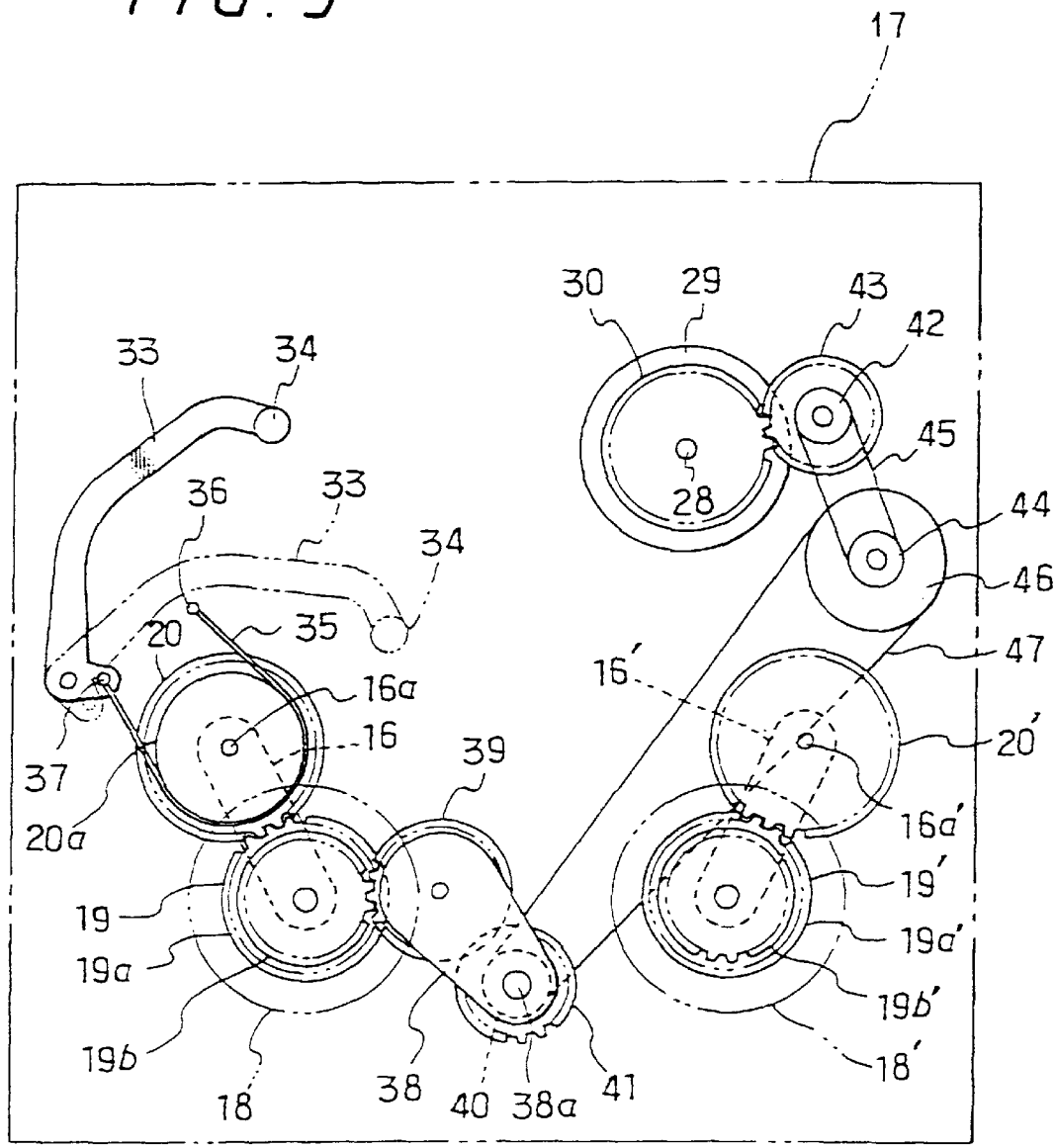
FIG. 3 is a plan view showing the main elements of the recording and reproducing apparatus deployed for large tape cassette use.
Figure 4:
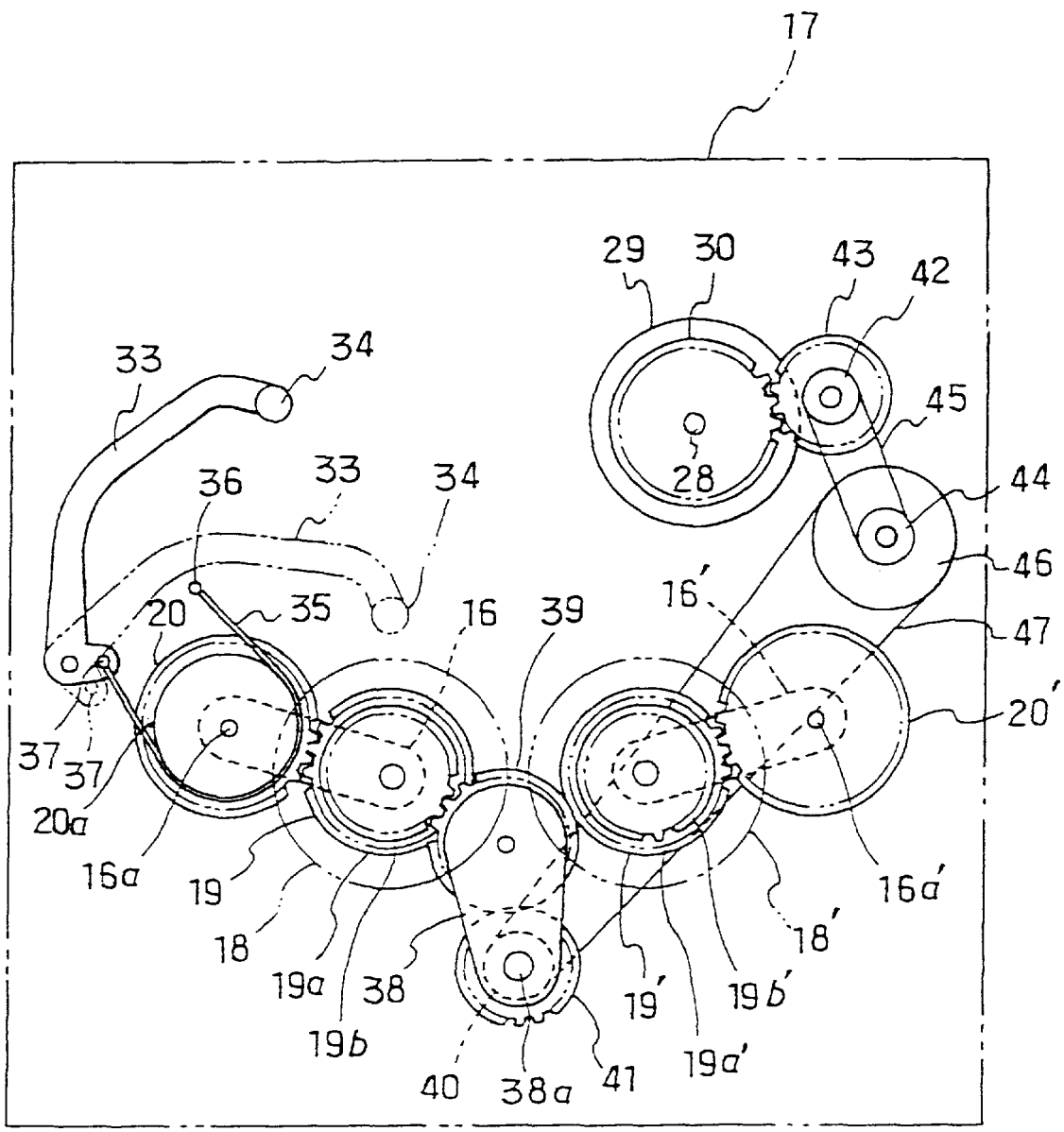
FIG. 4 is a plan view showing a main portion of the recording and reproducing apparatus deployed for small tape cassette use.

As shown in FIG. 2, there are provided a small tape cassette 8 and a cassette case 9 for the small tape cassette 8.

The cassette case 9 has an oblong rectangular flat box-shape which is very much smaller than the cassette case 2 of the large tape cassette 1 as seen from above. The cassette case 9 includes features, such as tape exits 10, 10, a mouth portion 11 or the like, and accommodates therein tape reels 13, 13, on which a magnetic tape 12 is wound. The tape reels 13, 13 include tape reel hubs 14, 14. The reel hubs 14, 14 include reel turntable engagement apertures 14a, 14a opened in the lower ends thereof. The reel turntable engagement apertures 14a, 14a are substantially the same in size as the reel turntable engagement apertures 7a, 7a of the tape reels 6, 6' of the large tape cassette 1.

A video tape recorder (VTR) 15 used in the embodiments of the invention is of the so-called compatible type which can use both the large and the small tape cassettes 1, 8.

Reel turntable arms 16, 16' are pivotally supported at their base end portions by rotary shafts 16a, 16a' on a chassis 17 such that the reel turntable arms 16, 16' are slightly spaced apart from each other in the left and right positions of the front of the chassis 17. The reel turntable arms 16, 16' include at their rotary end portions, pivotally supported reel turntables 18, 18'. Reel engagement shafts 18a, 18a' are projected from the upper surfaces of the reel turntables 18, 18'. The reel turntables 18, 18' have on their lower end portions integrally formed driven gears 19, 19'.

The driven gears 19, 19' comprise large gears 19a, 19a' meshed with tension gears, which will be described later, and small gears 19b, 19b' meshed with drive gears, all of which are integrally formed with the driven gears 19, 19'.

Tension gears 20, 20' are pivotally supported on the rotary shafts 16a, 16a' of the reel turntable arms 16, 16' and meshed with the large gears 19a, 19a' of the driven gears 19, 19'.

Because the tension gears 20, 20' are supported on the rotary shafts 16a, 16a' of the reel turntable arms 16, 16', even when the reel turntable arms 16, 16' are rotated, the tension gears 20, 20' are prevented from seperating from the driven gears 19, 19'.

The supply side tension gear 20 includes a brake drum 20a integrally formed with the lower side thereof.

The reel turntable arms 16, 16' are rotatable between the small tape cassette position shown in FIG. 2 and the large tape cassette position shown in FIG. 1. When the reel turntable arms 16, 16' are located in the small tape cassette position, the shaft distance between the reel turntables 18, 18' is equal to that between the tape reels 13, 13' of the small tape cassette 8. Further, when the reel turntable arms 16, 16' are located in the large tape cassette position, the shaft distance between the reel turntables 18, 18' is equal to that between the tape reels 6, 6' of the large tape cassette 1.

A drawing arm 21 is pivotally supported at its one end portion on the chassis 17 and a drawing guide 22 is vertically erected from another end portion of the drawing arm 21. Until the tape cassette 1 or 8 is loaded, i.e., in the initial state, the drawing arm 21 is located at the initial position shown by two-dot chain lines in FIGS. 1 and 2. During the tape loading mode in which the magnetic tape 5 or 12 is pulled out of the cassette case 2 or 9 and wrapped around the head drum which will be described later, when the reel turntable arms 16, 16' are located in the small tape cassette positions as shown in FIG. 2, the drawing arm 21 is rotated to the first drawing position shown in FIG. 2. Also, when the reel turntable arms 16, 16' are located in the large tape cassette positions as shown in FIG. 1, the drawing arm 21 is rotated to the second drawing position shown in FIG. 1.

A head drum 23 is provided on the chassis 17 at its substantially central portion of the inner left and right direction. The head drum 23 includes a stationary drum, a rotary drum, and a magnetic head (not shown) which is mounted on the rotary drum.

Tape loading blocks 24, 24 include loading guides 25, 25 and inclined guides 26, 26. The tape loading blocks 24, 24 are moved along guide slots 27, 27 formed on the chassis 17. In the initial state, the tape loading blocks 24, 24 are located at the initial positions shown by two-dot chain lines in FIGS. 1 and 2. In the tape loading mode, the tape loading blocks 24, 24 are translated to the loading completion position defined in the slightly inner left and right sides of the head drum 23.

A capstan 28 is rotated by a capstan motor 29 and projected upwardly from the chassis 17 at the position slightly distant to the right-hand side of the head drum 23.

The capstan motor 29 includes a gear 30 fixed to the output shaft thereof.

A pinch roller arm 31 is pivotally supported at its base end portion to the chassis 17 in the slightly inner right-hand side of the center thereof. The pinch roller arm 31 includes a pinch roller 32 pivotally supported to the rotary end portion thereof. In the initial state, the pinch roller arm 31 is located at the initial positions shown by the two-dot chain lines in FIGS. 1 and 2. Upon reproducing or recording, as shown by solid lines in FIGS. 1 and 2, the pinch roller arm 31 is translated to the position at which it is urged against the capstan 28 through the magnetic tape 5 or 12.

A tension regulator arm 33 is supported so that it can freely rotate from the position of one end near the other end to the slightly inner left-hand side of the center of the chassis 17.

In the initial state, the tension regulator arm 33 is located at the initial positions shown by the two-dot chain lines in FIGS. 1 and 2. Upon reproducing or recording, the tension regulator arm 33 is rotated from the initial position in the counter-clockwise direction to pull the magnetic tape 5 or 12 out of the cassette case 2 or 9.

The tension regulator arm 33 is rotated in the counter-clockwise direction as seen from above under spring force of a spring-biasing means (not shown). When actuated, the tension regulator arm 33 is urged against the magnetic tape 5 or 12 from the inside under spring force of the spring-biasing means.

A band-shaped brake band 35 is supported at its one end on a supporting portion 36 near the left end of the central portion of the chassis 17. The other end of the brake band 35 is supported on a supporting portion 37 of one end portion of the tension regulator arm 33. An intermediate portion of the brake band 35 is wrapped around the brake drum 20a of the supply-side tension gear 20.

When the tape cassette 1 or 8 is loaded onto the cassette loading position of the VTR 15, the drawing guide 22 which is located at the initial position, the loading guides 25, 25, the inclined guides 26, 26, the pinch roller 32 and the tension regulator pin 34 are relatively inserted into the mouth portion 4 or 11 of the tape cassette 1 or 8. when the large tape cassette 1 is loaded onto the cassette loading position of the VTR 15, the reel engagement shafts 18a, 18a' of the reel turntables 18, 18, which are placed at the large tape cassette position are engaged with the reel turntable engagement apertures 7a, 7a' of the tape reels 6, 6'. When, on the other hand, the small tape cassette is loaded onto the cassette loading position of the VTR 15, the reel engagement shafts 18a, 18a' of the reel turntables 18, 18' which are placed at the small tape cassette position are engaged with the reel turntable engagement apertures 14a, 14a' of the tape reels 13, 13'.

Then, the tape loading blocks 24, 24' are translated (moved) to the loading completion positions with the result that, the drawing guide 22 is moved to the second position shown in FIG. 1 when the tape cassette is the large tape cassette 1 and that, the drawing guide 22 is moved to the first position shown in FIG. 2 when the tape cassette is the small tape cassette B. Thus, the magnetic tape 5 or 8 is passed through a predetermined tape path. Upon reproducing or recording, the pinch roller 32 is urged against the capstan 28 through the magnetic tape 5 or 12, whereby the tension regulator arm 33 is rotated from the initial position to the counter-clockwise direction. Thus, the tension regulator pin 34 is brought in contact with the magnetic tape 5 or 12 from the inside under spring force.

When the tension of the magnetic tape 5 or 12 on the supply side from the head drum 23 is reduced, the tension regulator arm 33 is rotated in the counter-clockwise direction as seen from above, whereby the supporting portion 37 (supporting portion of the brake band 35) of one end portion is moved away from the tension gear 20. Thus, the brake band 35 tightens against the brake drum 20a of the tension gear 20, whereby the tension of the magnetic tape 5 or 12 is increased.

When, on the other hand, the tension of the magnetic tape 5 or 12 on the supply side with respect to the head drum 23 is increased, the tension regulator arm 33 is rotated in the clockwise direction as seen from above, whereby the supporting portion 37 approaches the tension gear 20. Thus, the force with which the brake band 35 tightens against the brake drum 20a of the tension gear 20 is weakened and the tension in the magnetic tape 5 or 12 is reduced.

The tension gear 20' includes a limiter mechanism (not shown) and the limiter mechanism applies a proper load to the magnetic tape 5 or 12 on the take-up side from the head drum 23.

A swing arm 38 is pivotally supported at its front end portion to the front end portion of the chassis 17 by a rotary shaft 38a. The swing arm 38 includes a swing gear 39 rotatably supported at its free end. This swing gear 39 transmits a drive force to the driven gears 19, 19'.

The rotary shaft 38a of the swing arm 38 is disposed on a point at which the perpendicular bisectors in which the two reel turntables can be translated cross each other so that, any time when the large tape cassette or the small tape cassette is used, the drive gear 39 is able to mesh with the driven gear 19 or 19' similarly.

A pulley 40 is rotatably supported on the rotary shaft 38a of the swing arm 38. This pulley 40 includes a gear 41 integrally formed therewith. The gear 41 is meshed with the drive gear 39.

A friction member (not shown) is interposed between the pulley 40 and the swing arm 38, and a torque limiter mechanism (not shown) is interposed between the gear 41 integrally formed with the pulley 40 and the drive gear 39.

A pulley 42 is rotatably supported on the chassis 17 in the vicinity of the capstan motor 29. The pulley 42 has a gear 43 integrally formed therewith. This gear 43 is meshed with the gear 30 fixed to the output shaft of the capstan motor 29.

A pulley 44 is rotatably supported on the chassis 17 at its substantially intermediate position in the front and rear direction of the right end side. A belt 45 is stretched between the pulley 44 and the pulley 42.

The pulley 44 has integrally formed therewith a pulley 46 having a diameter larger than that of the pulley 44. A belt 47 is stretched between the pulley 46 and the pulley 40 rotatably supported on the rotary shaft 38a of the swing arm 38.

Thus, when the capstan motor 29 is rotated, the pulley 40 is rotated through the pulley 42, the belt 45, the pulleys 44, 46 and the belt 47.

When the pulley 40 is rotated, the swing arm 38 is rotated by a friction produced between the pulley 40 and the swing arm 38 in the direction corresponding to the rotational direction of the pulley 40. Specifically, when the pulley 40 is rotated in the clockwise direction, the swing arm 38 is pivoted in the clockwise direction. When the pulley 40 is rotated in the counter-clockwise direction, the swing arm 38 is pivoted in the counter-clockwise direction.

Further, when the pulley 40 is rotated, the drive gear 39 that is meshed with the gear 41 integrally formed with the pulley 40 also is rotated.

Therefore, when the pulley 40 is rotated in the counter-clockwise direction, the drive gear 39 is rotated in the clockwise direction and meshed with the driven gear 19 which is integrally formed with the lower end portion of the reel turntable 18 by the pivoting of the swing arm 38 in the counter-clockwise direction, thereby rotating the driven gear 19 in the counter-clockwise direction. When, on the other hand, the pulley 40 is rotated in the clockwise direction, the drive gear 39 is rotated in the counter-clockwise direction. Then, the drive gear 39 is meshed with the driven gear 19 by the pivoting of the swing arm 38 in the clockwise direction, thereby rotating the driven gear 19 in the clockwise direction.

The drive gears 39, 39' rotate the driven gears 19, 19' to thereby rotate the reel turntables 18, 18' in the predetermined directions.

Figure 5:
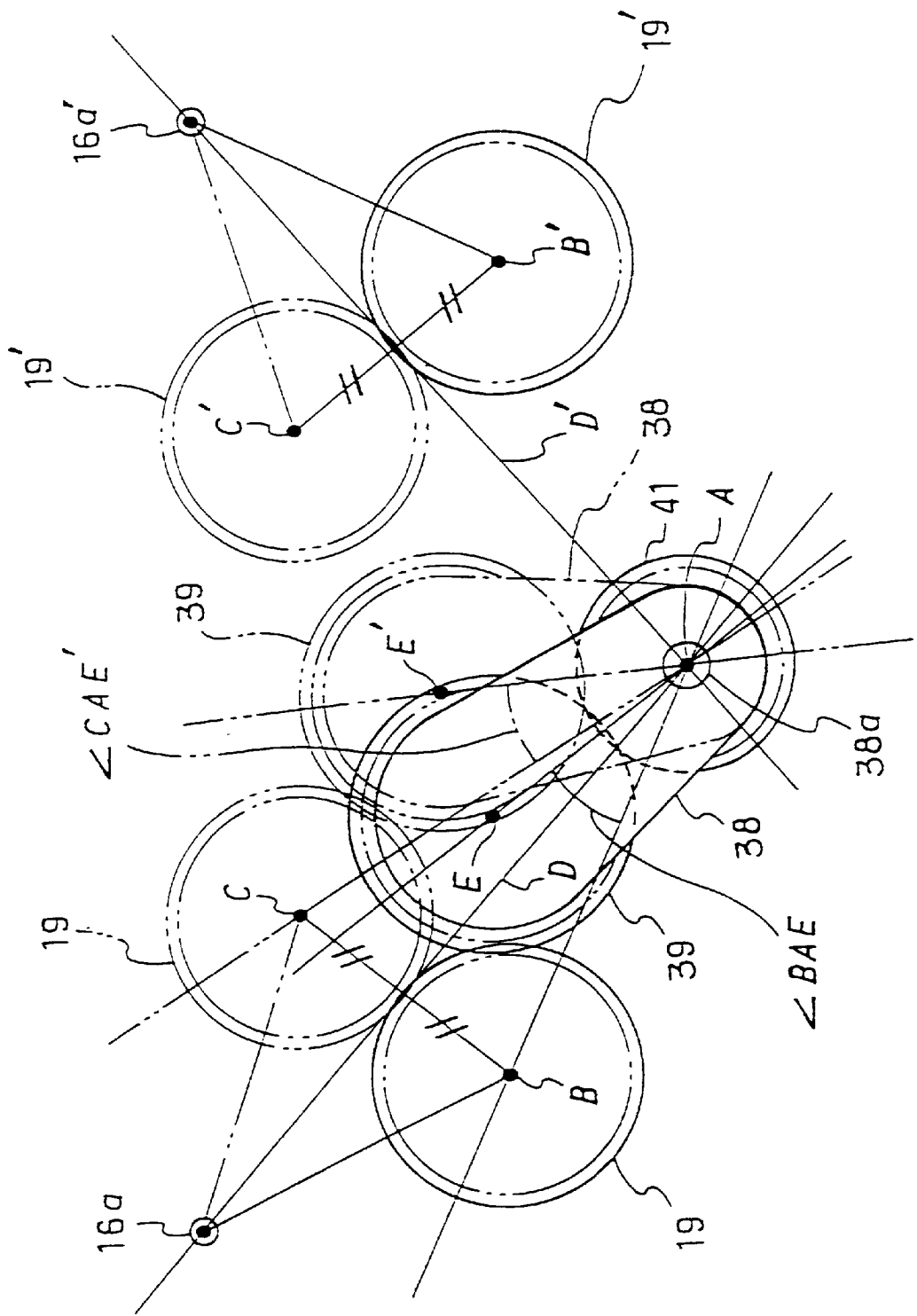
FIG. 5 is a plan view showing a positional relationship between a drive gear supported or a swing arm and a driven gear supported on a reel turntable arm.

A point A in FIG. 5 represents a center of axis of the rotary shaft 38a of the swing arm 38.

Points B, B' and points C, C' in FIG. 5 represent positions of the rotation centers of the driven gears 19, 19' supported on the reel turntable arms 16, 16', respectively. The points B, B' represent the positions of the rotation centers defined when the driven gears 19, 19' are located the large tape cassette positions. The points C, C' represent the positions of the rotation centers defined when the driven gears 19, 19' are located at the small tape cassette positions.

The point A is disposed at a point in which a perpendicular bisector D of a line BC and a perpendicular bisector D' of a line B'C' cross each other.

Since the center of axis of the rotary shaft 38a of the swing arm 38 is located at the point A, the drive gear 39 supported to the swing arm 38 and the driven gear 19 or the driven gear 19' can be meshed with each other under substantially the same condition even when the centers of the axes of the driven gears 19, 19' are located either at the large tape cassette position points (points B, B') or the small tape cassette position points (points C, C').

By way of example, FIG. 5 shows the meshed state of the drive gear 39 and the driven gear 19 defined when the driven gear 19 is located at the large tape cassette position and at the small tape cassette position.

A point E represents the position of the center of the axis of the drive gear 39 defined when the drive gear 39 is located at the large tape cassette position. A point E' represents the position of the center of the axis of the drive gear 39 (shown by a two-dot chain line in FIG. 5) defined when the drive gear 39 is located at the small tape cassette position.

An angle ∠BAE and an angle ∠CAE' become the same so that, even when the drive gear is located at either at the large tape cassette position or at the small tape cassette position, the drive gear 39 can transmit the drive force to the driven gear 19 under substantially the same engagement.

The rotary shaft 38a of the swing arm 38 need not always coincide with the point A precisely as described above, and the rotary shaft 38a of the swing arm 38 may be located near the point A.

A loading motor 48 is supported at the rear left end portion of the chassis 17. A rotation of the loading motor 48 drives the tape loading members, such as the tape loading blocks 24, 24 or the like through a gear train (not shown), thereby effecting the tape loading such that the magnetic tape 5 or 12 passes the predetermined tape path.

As described above, according to the present invention, there is provided a recording and reproducing apparatus to which two tape cassettes of different sizes having the supply reels and the take-up reels to and around which respective ends of the recording medium tape are fixed and wound are loaded, the supply reels and the take-up reels being spaced apart by different spacings and in which reel turntables that are in engagement with the tape reels are translated between two positions. The drive gear for driving the reel turntable is pivotally supported on the swing arm which is pivotally supported on the mechanical deck portion (chassis) and the drive gear is selectively meshed with one of the driven gears coaxially provided on the respective reel turntables. Thus, the reel turntable is rotated by driving the drive gear.

Therefore, according to the recording and reproducing apparatus of the present invention, even when the reel turntable is located at any one of the two positions, the driven gear provided on the reel turntable can be meshed with the drive gear so that the reel turntable can be rotated by transmitting the drive force of other motor to the drive gear. Thus, a motor exclusively-designed for rotating the reel turntables can be omitted and at least two reel turntables can be rotated by one motor.

The recording and reproducing apparatus according to a second embodiment of the present invention will be described below.

Figure 6:
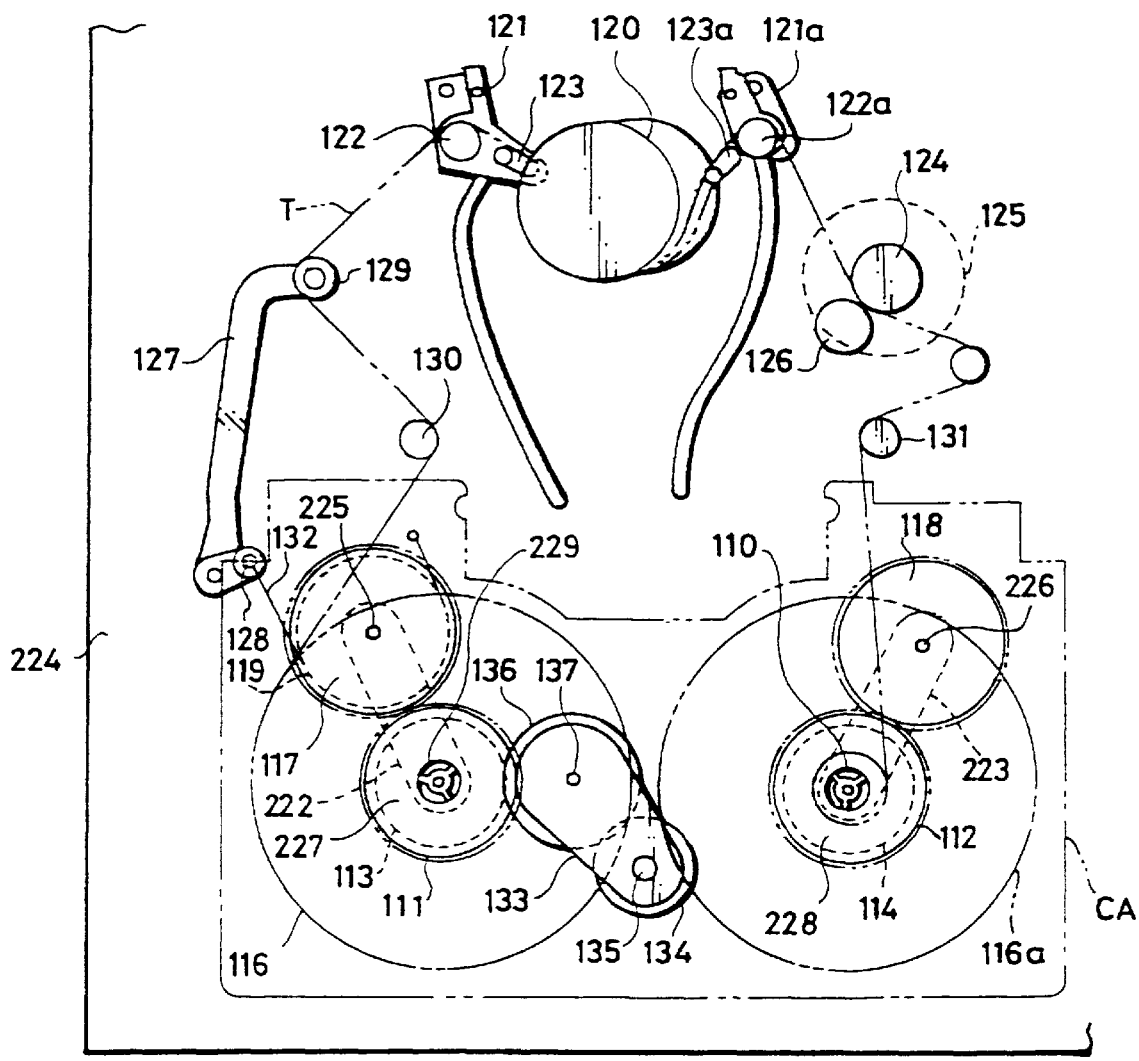
FIG. 6 is a plan view showing the tape path which occurs with a second embodiment of the present invention when a large tape cassette is loaded.
Figure 7:
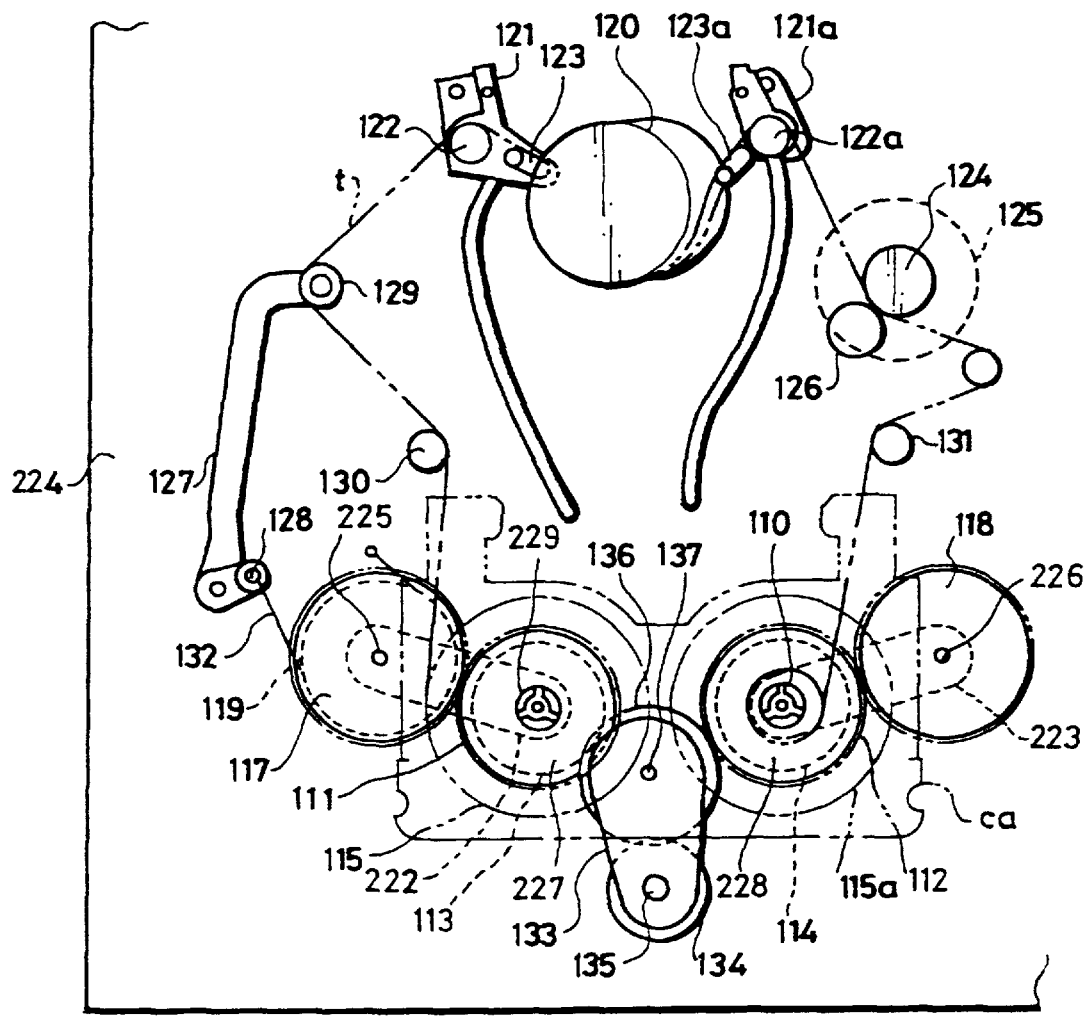
FIG. 7 is a plan view showing the tape path which occurs with the second embodiment of the present invention when a small tape cassette is loaded.

FIG. 6 is a plan view showing the tape path state of the recording and reproducing apparatus according to the second embodiment onto which a large tape cassette is loaded. FIG. 7 is a plan view showing the tape path state of the recording and reproducing apparatus according to the second embodiment onto which a small tape cassette is loaded.

In FIGS. 6 and 7, a phantom line CA depicts a large tape cassette, and a phantom line ca depicts a small tape cassette. Reference numeral 221 depicts generally a video tape recorder (VTR). The video tape recorder 221 is of the so-called compatible type which can play both the large and small tape cassettes CA and ca. Reference numerals 222 and 223 depict reel turntable supporting members whose one end portions are pivotally supported on supporting shafts 225, 226 formed on a mechanical deck portion or chassis member 224. The reel turntable supporting members 222, 223 include turntables 227, 228 pivotally supported thereon. Reference numerals 119, 110 depict reel engagement shafts projected from the centers of the reel turntables 227, 228. The reel turntables 227, 228 includes reel turntable upper gears 111, 112 and reel turntable lower gears 113, 114 integrally formed on their lower surfaces.

The reel turntable supporting members 222, 223 are rotated about the supporting shafts 225, 226 between the position of the small tape cassette ca shown in FIG. 7 and the position of the large tape cassette CA shown in FIG. 6. When the reel turntable supporting members 222, 223 are located at the position of the small tape cassette ca, the wheel base distance of the reel turntable 227, 228 is equal to that of the tape reels 115, 115a of the small tape cassette ca. When the reel turntable supporting members 222, 223 are located at the position of the large tape cassette CA, the wheel base distance of the reel turntables 227, 228 is equal to that of the tape reels 116, 116a of the large tape cassette CA.

Reference numeral 117 depicts a swing supporting point gear on the tape supply side, and reference numeral 118 depicts a swing supporting point gear on the tape rewinding side. The two swing supporting point gears 117, 118 are pivotally supported to be coaxial with the supporting point shafts 225, 226 of the reel turntable supporting members 222, 223. When the large tape cassette CA is in use or when the small tape cassette ca is in use, the swing supporting point gears 117, 118 are constantly meshed with the reel turntable upper gears 111, 112 of the reel turntables 227, 228.

The swing supporting point gear 117 on the tape supply side includes on its lower portion a brake drum 119 whose diameter is smaller than the gear diameter thereof.

A head drum 120 is provided on the backward central portion of the mechanical deck portion 224. The head drum 120 is comprised of a stationary drum and a rotary drum, though not shown. A magnetic head is mounted on the rotary drum (not shown). Tape loading blocks 121, 121a include loading guides 122, 122a and inclined guides 123, 123a. A capstan 124 is rotated by a capstan motor 125. Reference numeral 126 depicts a pinch roller.

Figure 8:
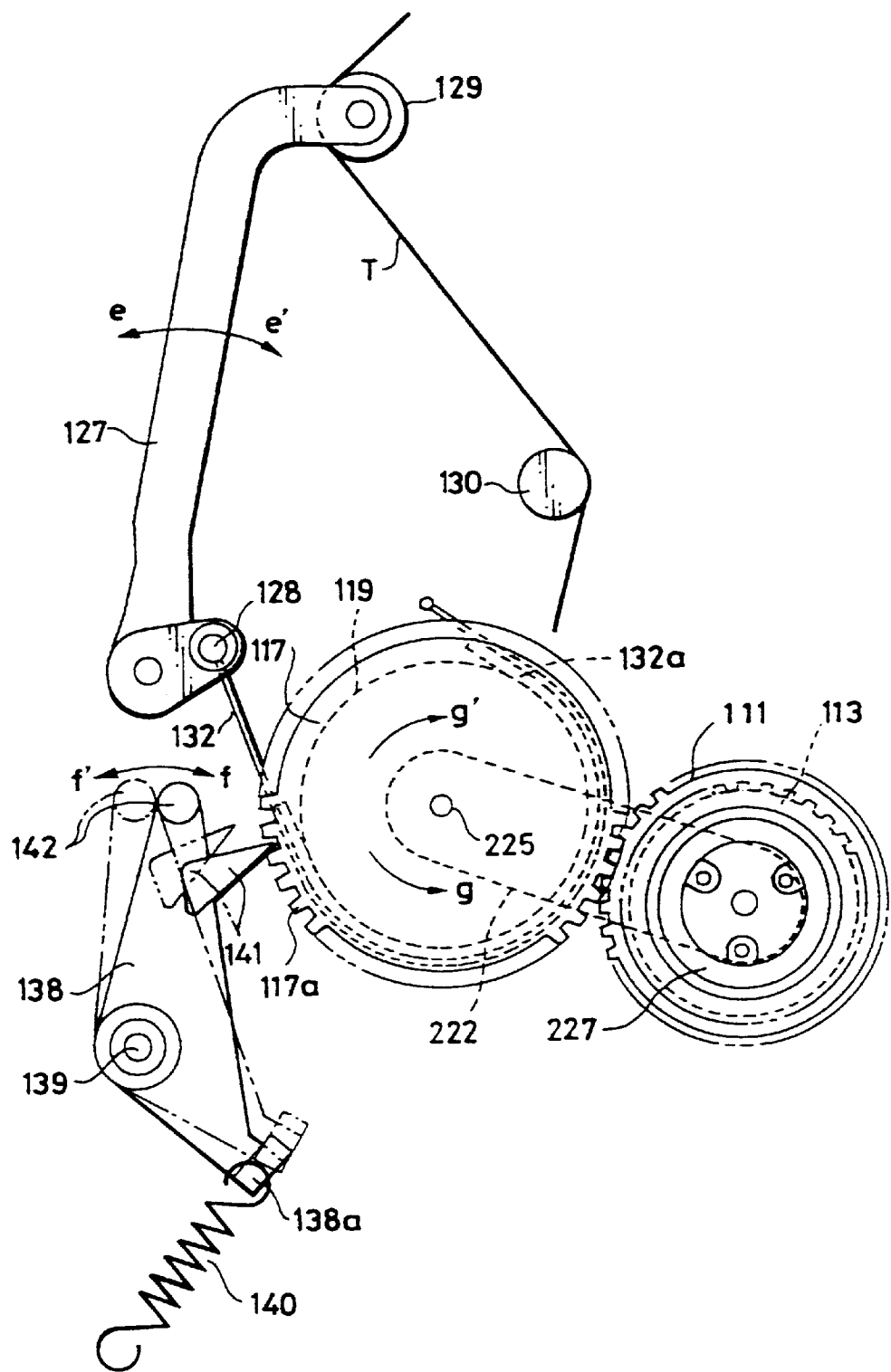
FIG. 8 is an enlarged plan view showing the elements proximate a swing supporting point gear on a tape supply side.

FIG. 8 is a plan view showing a portion surrounding the swing supporting point gear 117 on the tape supply side. In FIG. 8, reference numeral 127 depicts a tension regulator arm which constructs a tension regulator mechanism. The tension regulator arm 127 is pivotally supported at its portion near one end side so that it can be freely pivoted about a supporting shaft 128 in the direction shown by arrows e–e' in FIG. 8. The tension regulator arm 127 includes a tension regulator pin 129 at its free end.

The tension regulator arm 127 is rotatable in the arrow e direction under spring force of a spring means (not shown) so that, in the tape path state, the tapes T and t supplied from the supply tape reel 116a of the large tape cassette CA and the supply tape reel 116 of the small tape cassette ca are drawn against the inside of the tension regulator pin 129 through a guide post 130 under spring force.

The tapes T and t urged against the tension regulator pin 129 under spring force are wrapped around the head drum 120 from the entrance side loading guide 122 through the inclined guide 123 and then rewound around the take-up tape reel 116a through the exit side inclined guide 123a, the loading guide 122a, the capstan 124, the pinch roller 126 and the guide post 131.

A brake band 132 constitutes the braking mechanism. one end of the brake band 132 is fixed to a supporting portion 133 formed on the mechanical deck portion 224 and the other end portion thereof is fixed to the supporting portion 128 of the tension regulator arm 127. The brake band 132 has a pad 132a which is urged against the brake drum 119 of the supply-side swing supporting point gear 117.

When the tension of the tape pulled out from the supply tape reel is decreased, the tension regulator arm 127 is rotated by the spring means (not shown) in the arrow e direction, whereby the supporting portion 128 of the tension regulator arm 127 is moved away from the supply-side swing supporting point gear 117 to cause the brake band 132 to tighten against the brake drum 119. Thus, the tension of the tape is increased.

When the tension of the tape pulled out from the supply tape reel is increased, the tension regulator arm 127 is rotated in the arrow e' direction against the spring force, whereby the supporting portion 128 of the tension regulator arm 127 is moved toward the supply-side swing supporting point gear 117 thus reducing the force of the brake band 132 against the brake drum 132. Thus, the tension of the tape is decreased.

When either the large tape cassette CA or the small tape cassette ca are in use, the brake band 132 is not moved with respect to the brake drum 119 so that the tensions applied to the tapes T and t remains the same.

Reference numeral 133 depicts a swing arm which is pivotally supported at its swing supporting point gear 134 supported to one end portion to the mechanical deck portion 224 by means of a shaft 135. A swing gear 136 is pivotally supported to the other end portion of the swing arm 133 by means of a shaft 137. The swing supporting point gear 134 and the swing gear 136 are meshed with each other. The swing supporting point gear 134 and the swing arm 133 include a friction member (not shown) interposed therebetween.

The swing supporting gear 134 is driven by some suitable conventional methods seen in magnetic recording apparatus, so as to obtain a drive force from a capstan motor through a belt or the like and to obtain a drive force from an exclusively-used motor.

Operation of the swing supporting point gear 134 will be described below. When the swing supporting gear 134 is rotated, the swing arm 133 is rotated in the direction corresponding to the rotation direction of the swing supporting point gear 134 due to a friction between it and the swing arm 133. Then, when the swing supporting point gear 134 is rotated, the swing gear 136 meshed with the swing supporting point gear 134 is rotated so that, when the swing supporting gear 134 is rotated in the counter-clockwise direction, the swing gear 136 is rotated in the clockwise direction. Thus, when the swing arm 136 is rotated in the counter-clockwise direction, the swing supporting point gear 134 is meshed with the reel turntable lower gear 113 of the reel turntable 227, thereby rotating the reel turntable 227 in the counter-clockwise direction.

When the swing supporting gear 134 is rotated in the counter-clockwise direction, the swing gear 136 is rotated in the clockwise direction and the swing arm 133 is rotated in the clockwise direction to rotate the reel turntable lower gear 114 of the reel turntable 228, thereby rotating the reel turntable 228 in the clockwise direction.

Reference numeral 138 depicts a ratchet member provided on the supply-side swing supporting gear 117. The ratchet member 138 is pivotally supported on the mechanical deck portion 224 so as to become rotatable about a shaft 139 in the direction shown by arrows f–f' in FIG. 8. The ratchet member 138 has one end 138a connected to a tension coil spring 140 so that the ratchet member 138 is spring-biased in the f direction. The other end portion of the ratchet member 138 is formed with a pawl 141. When the ratchet member 138 is rotated, the pawl 141 engages with gear teeth 117a of the supply-side swing supporting point gear 117. Accordingly, due to the shape of the pawl 141, the swing supporting gear 117 is prevented from rotating in the direction shown by an arrow g in FIG. 8. When the swing supporting point gear 117 is rotated in the direction shown by an arrow g in FIG. 8, the ratchet member 138 operates as a ratchet mechanism wherein the pawl 141 is pushed by the gear teeth 117a and the ratchet lever 138 rotates against spring force of the tension coil spring 140, thereby achieving the ratchet effect.

A pin 142 is formed on the outer end of the lever 141. When the pin 142 is translated by a mode slider (not shown) provided on the mechanical deck portion 224 against the spring force of the spring 140 in the f' direction, the pawl 141 is moved in the f' direction and seperated from the gear teeth 117a of the supply-side swing supporting point gear 117, whereby the ratchet member 138 remains released regardless of the rotational direction of the swing supporting point gear 117.

Figure 9:
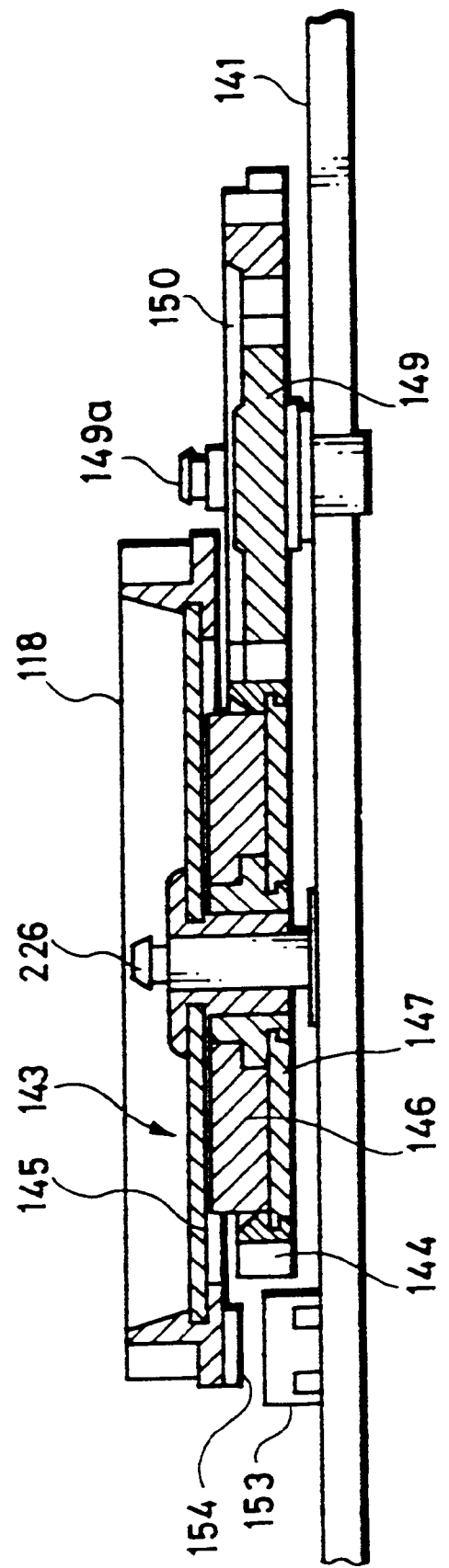
FIG. 9 is a cross-sectional view showing a swing supporting point gear on the tape rewinding side along with an associated clutch mechanism.

In FIG. 9, reference numeral 143 depicts a clutch mechanism which acts as a magnetic type limiter mechanism. The clutch mechanism 143 is arranged such that a proper torque is transmitted between the swing supporting gear 118 and the limiter gear 144 by a magnetic type limiter mechanism formed of a limiter gear 144 provided on the lower portion of the rewind-side swing supporting point gear 118 to become coaxial with the supporting shaft 226, a clutch plate 45 provided on the rear surface of the swing supporting point gear 118, a magnet provided on the limiter gear 144 and a back yoke 147.

Figure 10A:
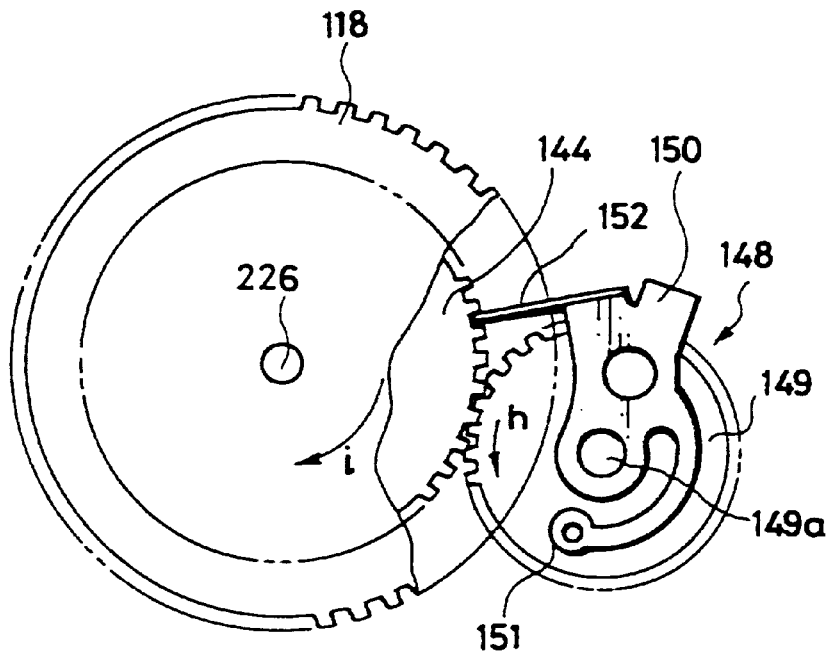
FIGS. 10A and 10B are plan views showing the swing supporting gear on the tape rewinding side along with an associated one-way mechanism, respectively.
Figure 10B:
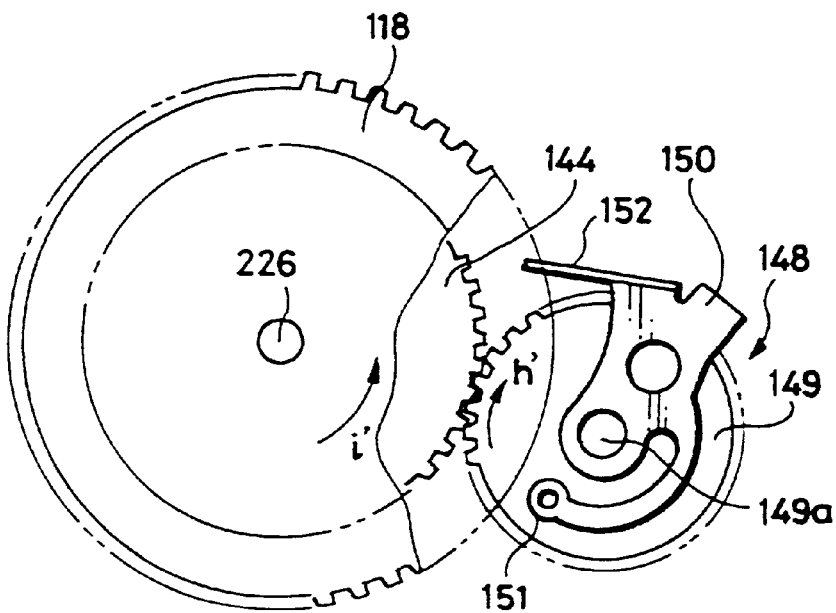

In FIGS. 10A and 10B, reference numeral 148 depicts a one-way mechanism provided on the rewind-side supporting point gear 118. The one-way mechanism 148 comprises a one-way gear 149 meshed with the rewind-side supporting point gear 118 and a one-way member 150. The one-way member 150 is pivotally supported on a supporting shaft 149a of the one-way gear 149 and includes a spring portion 151 for generating a friction force between it and the one-way gear 149.

When the one-way gear 149 is rotated in the direction shown by arrows h–h' shown in FIGS. 10A, 10B, due to the friction generated by the spring portion 151, the one-way member 150 is urged to rotate in the direction shown by arrows h–h', by the one-way gear 149. A lever 152 is formed on the one-way mechanism 148 on the side opposite to the spring portion 151 at the same height of the gear portion of the limiter gear 144. The lever 152 is rotated in unison with the rotation of the one-way member 150. Since the one-way gear 149 is applied with the rotational torque from the limiter gear 144 and the limiter gear 144 is applied with the rotational torque from the rewind-side swing supporting point gear 118, the rotational direction of the one-way member 150 is determined by the rotational direction of the rewind-side swing supporting gear 118.

Operation of the one-way mechanism will be described with reference to FIGS. 10A, 10B, in which case the large tape cassette is assumed to be loaded onto the recording and reproducing apparatus, for example. When the tape T is rewound to the supply tape reel 116 from the take-up tape reel 116a, i.e., transported in the so-called rewind direction, the take-up reel 116a is rotated in the counter-clockwise direction so that the rewind-side swing supporting point gear 144 meshed with the reel turntable upper gear 112 also is rotated in the direction shown by an arrow i in FIG. 10B. Thus, the one-way gear 149 meshed with the limiter gear 144 also is rotated in the arrow h direction. At that time, the one-way member 150 is rotated in the arrow h direction and the lever 152 is meshed with the gear of the limiter gear 144 so that the limiter gear 144 is inhibited from rotating any more and stopped (see FIG. 10A). As a result, a slippage occurs between the rewind-side swing supporting gear 118 and the limiter gear 144 so that a proper tension is applied to the tape T by the above-mentioned magnetic type clutch mechanism 143. Therefore, a proper braking torque acts on the rewind-side swing supporting point gear 118.

When, on the other hand, the tape T is rewind to the take-up reel 116a from the supply tape reel 116, i.e., transported in the so-called forward direction, the take-up tape reel 116a is rotated in the clockwise direction so that the rewind-side swing supporting point gear 118 meshed with the reel turntable upper gear 112 is rotated in the arrow i' direction. As a result, the limiter gear 144 provided coaxially with the swing supporting point gear 118 also is rotated in the arrow i' direction and the one-way gear 149 meshed with the limiter gear 144 is rotated in the arrow h' direction. At that time, the one-way member 150 is rotated in the arrow h' direction, whereby the lever 152 is detached from the gear of the limiter gear 144 and rotated to the position of a stopper (not shown) and then stopped (see FIG. 10B). As a result, no slippage occurs between the rewind-side swing supporting point gear 118 and the limiter gear 144 so that a torque loss is not produced. Therefore, the tape T can be rewound to the supply tape reel 116.

The clutch mechanism which applies the braking torque to the rewind-side swing arm supporting point gear 118 is not limited to the magnetic type. Also, the one-way mechanism 148 is not limited to the engagement between the lever 152 and the limiter gear 144 and may be a mechanism having a similar function.

A rotation detection of the tape reel will be described below with reference to the rewind-side swing supporting point gear 118 shown in FIG. 9, for example. A rotation of the tape reel is detected by a reflection type photo-interrupter 153 and a reflection label 154. The reflection label 154 is bonded to the lower surface of the swing supporting point gear 118, and the photo-interrupter 153 provided on the mechanical deck portion detects the rotation of the swing supporting point gear 118. Since the swing supporting point gear 118 is meshed with the reel turntable gear 112, even when the large tape cassette CA or the small tape cassette ca is in use, the rotations of the reel turntables 27, 28 can be detected by a pair of sensors without the need of using two pairs of sensors at the exclusive positions.

Further, since the clutch mechanism 143 is provided in the rewind-side swing supporting point gear 118 and includes the limiter gear 144, unlike the type in which a rotational difference is absorbed by the reel turntable according to the conventional 8-mm VTRL for example, even when the reel turntable is translated, the rotation of the reel turntable can be detected accurately.

Figure 11:
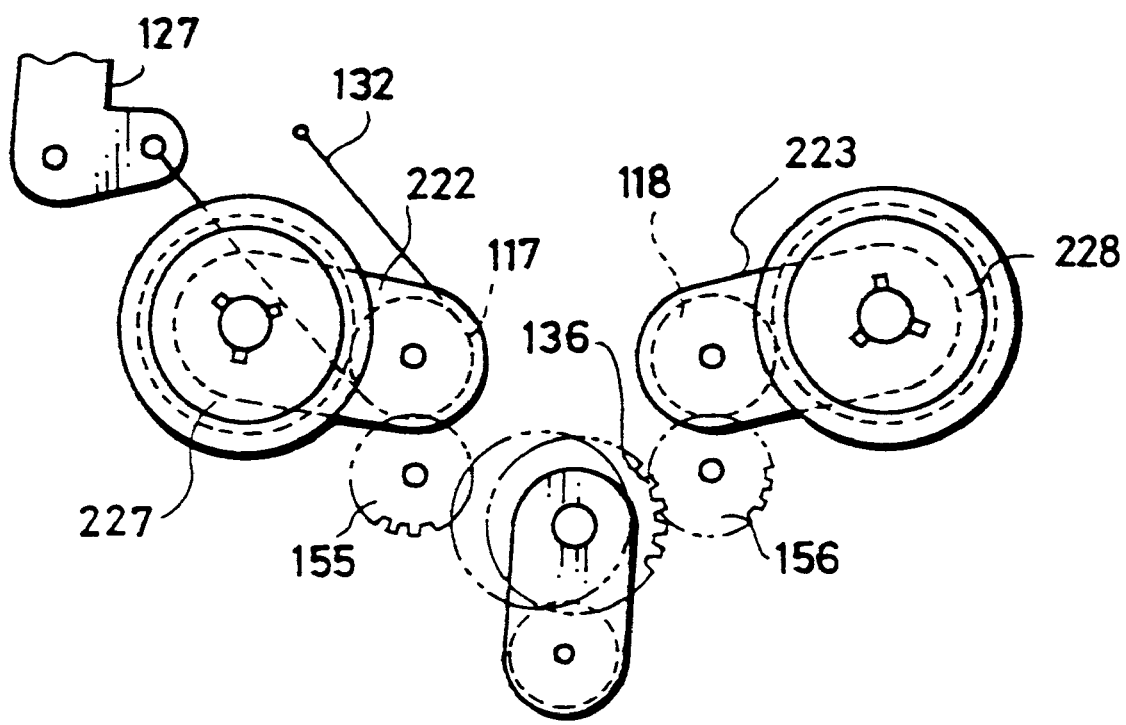
FIG. 11 is a plan view showing the recording and reproducing apparatus according to a third embodiment of the present invention.

A third embodiment of the present invention will be described below with reference to FIG. 11. As shown in FIG. 11, driven gears 155, 156 may be meshed with the swing supporting point gears 117, 118 and the swing gear 136 may be meshed with the driven gears 155, 156. Alternatively, the swing gear 136 may be meshed with a gear train (not shown)

which is meshed with the driven gears 155, 156. In that case, the tension regulator mechanism, the clutch mechanism and the one-way mechanism are provided on the swing supporting point gears 117, 118 or the driven gears 155, 156 or the gear train.

As set forth above, the recording and reproducing apparatus according to the present invention includes the mechanism in which the reel turntables are rotated about the supporting shafts provided on the mechanical deck portion and translated and the swing supporting gears coaxially provided with the supporting shafts are meshed with the reel turntable gears provided on the reel turntables, the braking mechanism provided on one of the swing supporting point gear, the gear coaxially formed with the swing supporting point gear and the gear of the gear train of the swing supporting point gear at its portion opposing the reel turntable gear side for controlling a rotational torque of the tape reel turntable, the clutch mechanism for applying a predetermined tape tension to the tape in the tape path, and the one-way mechanism, when the indirect reel driving in which the reel turntables are rotated by the existing motor, such as the capstan motor without using the motors exclusively designed for the reel turntables is carried out, proper torques can be applied to the respective reel turntables and the rotations of the reel turntables can be detected with ease. Moreover, the recording and reproducing apparatus of the present invention can be miniaturized, made light in weight and inexpensive.

Having described preferred embodiments of the invention with reference to the accompanying drawings, it is to be understood that the invention is not limited to those precise embodiments and that various changers and modifications could be effected therein by one skilled in the art without departing from the spirit or scope of the invention as defined in the appended claims.

What is claimed is:

1. A tape cassette playing and recording apparatus capable of playing and recording both a first and a second type of tape cassettes which respectively have different sizes and differently spaced supply and take-up reels, said apparatus comprising:

a drive gear for selectively rotating a first reel turntable or a second reel turntable;

a swing arm pivotally supported on a mechanical deck of said apparatus, said swing arm having said drive gear rotatably supported thereon;

first and second driven gears which are coaxially provided on said first and second reel turntables respectively, said drive gear being selectively engaged with one of said first and second driven gears by pivotal movement of said swing arm so that a reel turntable, which is associated with a driven gear which is engaged by said drive gear is rotated by said drive gear;

first and second turntable arms, wherein said first turntable and said second turntable are rotatably mounted respectively on said first and second turntable arms, said first and second turntable arms being pivotally mounted on said mechanical deck and pivotal between a first position corresponding to said first type of cassette tape and a second position corresponding to said second type of cassette tape;

a reversible capstan drive motor;

a pulley which is rotatably supported on a rotary shaft about which said swing arm is pivotally supported on the mechanical deck, said pulley being driven by said capstan drive motor and having an integral gear which engages said drive gear such that said capstan drive motor drives said drive gear; and a braking mechanism controlling a rotational torque of said first reel turntable, wherein said braking mechanism is responsive to tension in a tape which is being unwound from a supply reel operatively seated on said first reel turntable;

wherein said first turntable comprises a tension gear which constantly engages said first driven gear; and wherein said braking mechanism comprises a brake drum formed on said tension gear.

2. An apparatus as claimed in claim 1, wherein said braking mechanism includes a tension regulator for regulating the tension of said tape thereby rendering the braking mechanism responsive to the tension in said tape, said tape extending between said supply reel and a take-up reel.

3. An apparatus as claimed in claim 1, further comprising a tension regulator arm which is pivotally mounted on said mechanical deck, said tension regulator arm having a tape guide mounted on an end thereof for guiding said tape between said supply reel and a take-up reel.

4. An apparatus as claimed in claim 3, further comprising a brake band which is wound around said brake drum between a fixed point and an end of said tension regulator arm opposite said end on which is mounted said tape guide.

5. An apparatus as claimed in claim 1, further comprising a head drum for recording a data signal on a magnetic tape or reproducing a data signal recorded on a magnetic tape.

6. An apparatus as claimed in claim 5, further comprising a drawing arm for drawing a magnetic tape wound between a supply reel seated on said first turntable and a take-up reel seated on said second turntable over said head drum.

7. A tape cassette playing and recording apparatus which is compatible with both first and second tape cassettes which respectively have different sizes and differently spaced supply and take-up reels, said apparatus comprising:

a drive gear for selectively rotating a first reel turntable or a second reel turntable on said apparatus;

a swing arm pivotally supported on a mechanical deck of said apparatus, said swing arm having said drive gear rotatably supported thereon;

first and second driven gears which are coaxially provided on said first and second reel turntables respectively, said drive gear being selectively engaged with one of said first and second driven gears by pivotal movement of said swing arm so that said drive gear drives the driven gear engaged;

a rotary arm pivotally supported on the mechanical deck, said rotary arm having said first reel turntable rotatably supported thereon;

a tension gear rotatably supported on a shaft about which said rotary arm is pivotal so as to be constantly engaged with said first driven gear;

a brake drum formed on said tension gear; and a brake band wound around said brake drum, said brake band being operatively connected with said first reel turntable and responsive to tension in a tape which is being wound off a supply reel operatively seated on said first reel turntable.

8. The recording and reproducing apparatus according to claim 7, wherein said drive gear supported on said swing arm is driven by a capstan motor.

* * * * *

UNITED STATES PATENT AND TRADEMARK OFFICE
CERTIFICATE OF CORRECTION

PATENT NO. : 5,992,781
DATED : November 30, 1999
INVENTOR(S) : SUZUKI et al.

It is certified that error appears in the above-identified patent and that said Letters Patent is hereby corrected as shown below:

Cover sheet should read,

[54] INDIRECT DRIVE MECHANISM FOR RECORDING AND REPRODUCING APPARATUS CAPABLE OF ACCOMMODATING DIFFERENT SIZE CASSETTES

Signed and Sealed this

Tenth Day of April, 2001

*Attest:*

NICHOLAS P. GODICI

*Attesting Officer*   *Acting Director of the United States Patent and Trademark Office*